Aug. 25, 1953        E. G. GUSTAFSON        2,649,760
COMBINE CHAFFER
Filed Oct. 25, 1950

Elmer G. Gustafson   INVENTOR.
BY Bush Bush.
His Attorneys.

Patented Aug. 25, 1953

2,649,760

UNITED STATES PATENT OFFICE 2,649,760

COMBINE CHAFFER

Elmer G. Gustafson, Cambridge, Ill.

Application October 25, 1950, Serial No. 192,018

2 Claims. (Cl. 130—24)

My invention relates to improvements in combines and threshing machines.

The objects of my invention are to provide means in a combine or threshing machine for more completely separating the grain from the chaff and for saving grain which would otherwise be lost; to provide means which will facilitate the expulsion of chaff with the straw, using the term "chaff" to designate small parts of the straw, leaves, small sticks, hulls of grain and other waste matter which goes into the threshing machine with the bundles of grain to be threshed.

Figure 1:
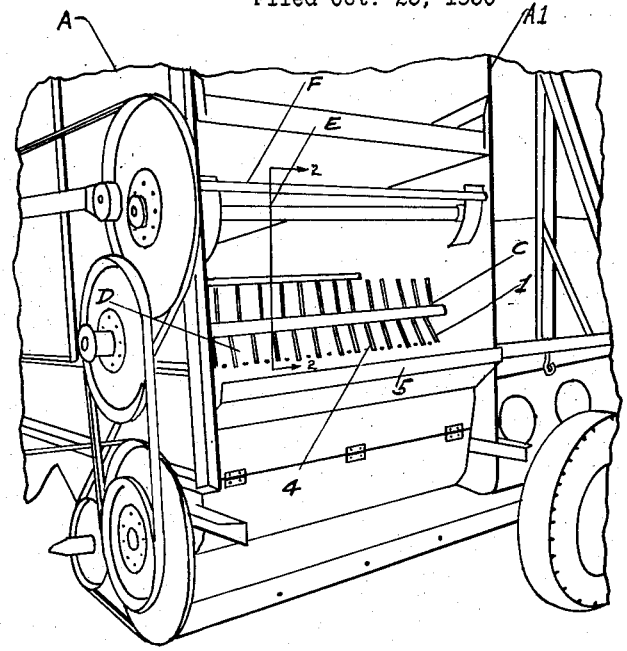
Figure 2:
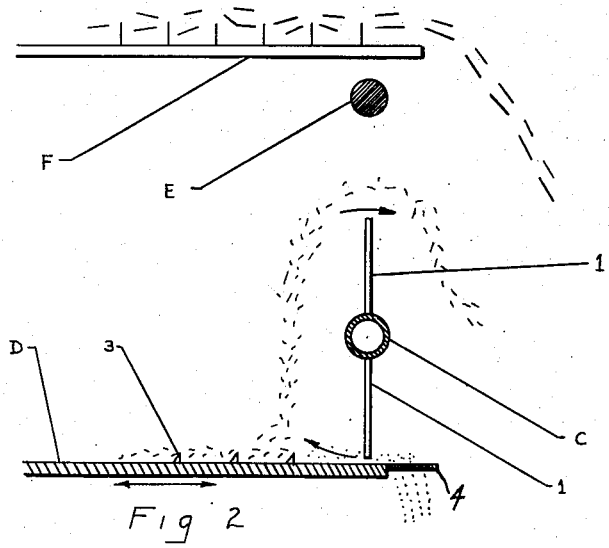

I accomplish these objects by the means shown in the accompanying drawings, in which, Figure 1 is a perspective view of the rear part of a combine of the side delivery class;

Figure 2 is a diagrammatic vertical section on the line 2—2 of Figure 1.

My apparatus may be installed in the rear end of a combine arranged to deliver the straw out of an opening at one side of the combine or it may be installed in the rear end of a thresher discharging the straw out the rear end of the thresher. It may be used with various makes or types of threshers or combines. The drawings omit details of functional parts of such machines which are in common use.

Supported by and journaled in the rear end plate A and an opposite supporting plate A1, is the shaft E which in common practice is used to reciprocate the vibratory carrier F that carries the straw from the cylinder and concave and discharges it out of the side or out of the rear end of the machine as the case may be.

Under the shaft E I mount a shaft C which may also be journaled in the plates A and A1, but with one end projecting through the plate A and carrying a pulley arranged to drive the shaft E by a belt from any convenient form of pulley operated by the driving mechanism of the combine or thresher.

The shaft C has united thereto by welding or other suitable means, a plurality of fingers 1 which project radially from opposite sides of the shaft and may be arranged in straight lines longitudinally of the shaft or arranged in spiral lines if desired.

The straw carrier F may be in the form of a grating or any of the other forms of carrier in common use which will carry the straw but will allow the grain and chaff mixed with it to drop onto a reciprocating chaff carrier D. The chaff carrier D may be a plate of any of the conventional forms, but is provided with upstanding lugs or prongs 3 sloping forwardly and arranged to help advance the chaff thereon as it reciprocates.

The outer end of the carrier D has secured thereto or formed integral therewith longitudinal projecting spaced fingers 4 through which the grains of wheat, barley, etc. may fall to the conveyor 5 which may be of any convenient type.

In Figure 2 I have shown in broken lines the course of the straw as it leaves the straw carrier and drops out of the machine, and in short dashes the course taken by the chaff as it is picked up by the fingers 1 which revolve in the direction shown by the arrows and throw the chaff into the stream of straw. I have also shown in small dots the course of the grains which drop from the spaced fingers into the conveyor.

It will be understood that the shaft E is a part of the machines in common use and may be driven by any suitable form of driving mechanism operated by the prime mover of the combine.

Various modifications may be made in the form and proportions of the parts without departing from the spirit of my invention as expressed in the claims and I do not limit my claims to the precise forms shown in the drawings.

I claim:

1. In a thrasher having one end from which straw and chaff are discharged, a vibratory chaff and grain carrier mounted for reciprocating movement toward and away from the discharge end of said thrasher, means for reciprocating said carrier to move chaff toward said discharge end, a plurality of spaced fingers at the discharge end of said carrier, united thereto and projecting in the direction of discharge of said chaff, a shaft rotatably mounted above said fingers, a plurality of radial fingers rigidly united to said shaft and spaced apart, said fingers being long enough to engage chaff resting upon said fingers on said carrier, and means driving said shaft in a direction to move said radial fingers along said carrier fingers away from said discharge end to propel chaff back over said carrier and upwardly to release the grain therefrom.

2. In a thrasher having one end from which straw and chaff are discharged and having a vibratory chaff and grain carrier mounted for reciprocating movement toward and away from the discharge end of said thrasher with means for reciprocating said carrier to move chaff toward said discharge end, the combination with a plurality of spaced fingers at the discharge end of said carrier united thereto and projecting in the direction of the movement of said chaff on said carrier, of a shaft rotatably mounted above said fingers, a plurality of radial fingers rigidly united to said shaft and spaced apart, said radial fingers being long enough to engage chaff passing or resting upon the fixed fingers on said carrier, and means driving said shaft in a direction to revolve said radial fingers moving them along said carrier fingers inwardly away from said discharge end and upwardly to propel chaff backwardly over said carrier and upwardly to release the grain therefrom and then outwardly to remove the chaff.

ELMER G. GUSTAFSON.

References Cited in the file of this patent

UNITED STATES PATENTS

| Number | Name | Date |
|---|---|---|
| 257,922 | Dalton | May 16, 1882 |
| 525,749 | Swenson | Sept. 11, 1894 |
| 550,027 | Reeves et al. | Nov. 19, 1895 |
| 790,999 | Barrows | May 30, 1905 |
| 890,129 | Dugan | June 9, 1908 |
| 1,290,610 | Luedke | Jan. 7, 1919 |
| 1,313,427 | Synck | Aug. 19, 1919 |
| 1,731,142 | Lee | Oct. 8, 1929 |
| 1,917,536 | McIntire | July 11, 1933 |

FOREIGN PATENTS

| Number | Country | Date |
|---|---|---|
| 118,121 | Australia | Feb. 9, 1944 |